(No Model.)

R. H. BEST.
APPARATUS FOR RAISING OR LOWERING CENTER LIGHTS OF CHANDELIERS.

No. 568,015. Patented Sept. 22, 1896.

Witnesses
H. van Oldenneel
Otto Munk

Inventor
Robert Hall Best
by Richards
Attorneys

UNITED STATES PATENT OFFICE.

ROBERT H. BEST, OF BIRMINGHAM, ENGLAND.

APPARATUS FOR RAISING OR LOWERING CENTER LIGHTS OF CHANDELIERS.

SPECIFICATION forming part of Letters Patent No. 568,015, dated September 22, 1896.

Application filed May 21, 1896. Serial No. 592,418. (No model.) Patented in England March 10, 1894, No. 5,026.

*To all whom it may concern:*

Be it known that I, ROBERT HALL BEST, a citizen of Great Britain, and a resident of Cambray Works, Handsworth, in the city of Birmingham, England, have invented certain new and useful Improvements Connected with the Apparatus for Raising or Lowering the Center Lights of Chandeliers and Electroliers, (for which I have obtained a patent in Great Britain, No. 5,026, bearing date March 10, 1894,) of which the following is a specification.

My invention relates to apparatus for raising and lowering the center lights of chandeliers and electroliers; and it consists of improvements in detail upon such known apparatus in which a balance-crank arm carries the suspended light.

My invention has for its object the adaptation of a counterpoise-weight to balance the fitting in any position; and it consists in the separation of the extended portion of the crank-arm to which the counterpoise-weight is attached from the crank-arm to which the light is attached, and the connection of these two arms by means of rods, chains, or cranks, so that the light may balance in any position, and when applied to "pendants" so that the pendant may hang plumb.

The accompanying drawings make clear the nature of my invention and the manner in which I carry it into effect.

Figure 1:
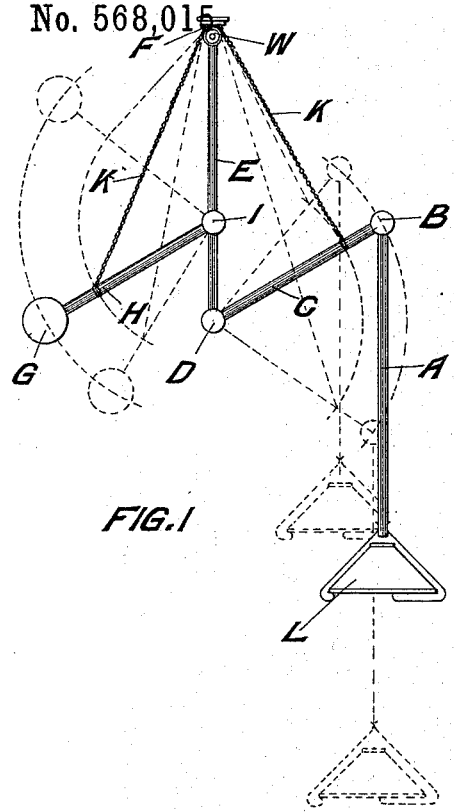
Figure 3:
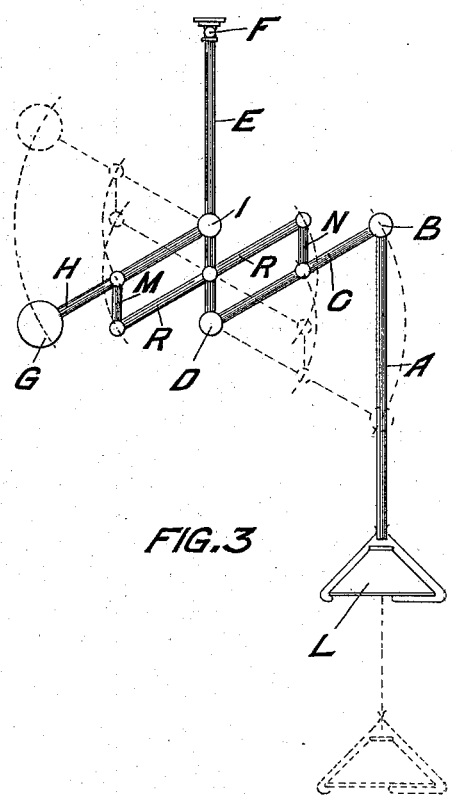
Figure 2:
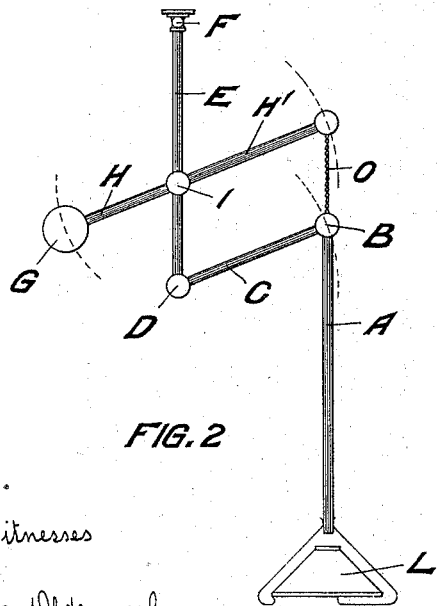

Figure 1 is a side elevation of one form of my invention applied to a suspension-lamp, showing in dotted lines two of the positions into which the light may be placed. Figs. 2 and 3 are also side elevations of other forms of my invention.

A is the rod of the light, attached to the crank-arm C by means of the swivel-joint B, the crank-arm C being attached by means of a swivel-joint to the descending rod E at D. The rod E is hung by the ordinary suspending-screw or by the ordinary ball-joint F. The counterpoise weight or weights G are carried by the crank-arm H, which is attached by a swivel-joint I to the rod E above (or, if desired, below) the joint D of the other arm, C. The arms C and H are connected by means of the cord, chain, or wire K, working over a pulley or wheel W on the rod E, (see Fig. 1,) or the fittings may take the form shown in Fig. 2, with the crank-arm H, which carries the weight G, extended in the direction of H', but not directly supporting the rod A, which carries the lamp L. This extended portion H' of the arm H is then attached to the arm C by means of a chain, links, cord, or the like, O.

Fig. 3 shows the arm H, carrying the weight G, connected by a crank M to one end of a pivoted bar R, the other end of this pivoted bar R having a crank-piece N attaching it to the arm C, thus connecting the arms C and H. One advantage of this arrangement over that previously used is found in the fact that the separate arm and its joint takes the strain of the counterpoise-weight entirely off the joints which carry the light.

Having now described my invention, what I claim as new, and desire to secure by Letters Patent, is—

1. An apparatus for raising and lowering the center lights of chandeliers and electroliers, consisting in combination of a center rod or tube, opposing arms pivoted at different points to the said center rod or tube, one of the opposing arms carrying a balance-weight, and the other the lamp or light to be balanced and a connection between the opposing arms, substantially as described.

2. In combination, the center rod or tube, opposing arms pivoted at different points to the said rod, a weight acting upon one of said opposing arms, the other arm carrying the lamp and the connection between the opposing arms comprising an extension of the weighted arm with means for connecting the same with the lamp-carrying arm.

In witness whereof I have hereunto set my hand in presence of two witnesses.

ROBT. H. BEST.

Witnesses:
 HERBERT BOWKETT,
 THOMAS J. BAYLISS.